United States Patent [19]

Lecluse

[11] 3,865,959

[45] Feb. 11, 1975

[54] EDIBLE PROTEIN FIBERS BASED ON CASEIN AND A PROCESS FOR PREPARING SAME

[75] Inventor: Willem Jan Lecluse, Veenwouden, Netherlands

[73] Assignee: Cooperatieve Condensfabriek "FRIESLAND", Leeuwarden, Netherlands

[22] Filed: Dec. 8, 1972

[21] Appl. No.: 313,255

[30] Foreign Application Priority Data

Dec. 10, 1971 Netherlands....................... 7116966

[52] U.S. Cl................. 426/212, 426/276, 426/364
[51] Int. Cl. ............................................... A23j 3/00
[58] Field of Search ............ 426/104, 137, 212, 276, 426/364

[56] References Cited
UNITED STATES PATENTS

| | | | |
|---|---|---|---|
| 2,952,543 | 9/1960 | Szczesniak et al.................. | 426/137 |
| 3,210,195 | 10/1965 | Kjelson et al........................ | 426/137 |
| 3,455,697 | 7/1969 | Atkinson............................. | 426/137 |
| 3,493,386 | 2/1970 | Pyne.................................... | 426/137 |

Primary Examiner—James R. Hoffman
Attorney, Agent, or Firm—Kurt Kelman

[57] ABSTRACT

Casein-based edible protein fibers containing, in addition to the ionic groups present in the casein, at least 0.04 gram mole of earth alkaline metal ions, at least 0.005 gram mole of alkali metal and/or ammonium ions, and at least 0.012 gram mole of anions of polybasic acids, per 100 grams of protein. Also, a process for the manufacture thereof.

9 Claims, No Drawings

EDIBLE PROTEIN FIBERS BASED ON CASEIN AND A PROCESS FOR PREPARING SAME

This invention relates to edible protein fibres based on casein and a process for manufacturing said fibres.

One of the greatest difficulties when preparing meat substitutes is obtaining a masticability or tenderness resembling or approaching those of meat. This masticability or tenderness is due to the fibrous structure.

Various methods are known for preparing foodstuffs with a more or less pronounced fibre structure. One of the best known methods, e.g., that described in U.S. Pat. No. 2,682,466, is based on the manufacture of edible protein fibres in a wet-spinning process, a protein-rich raw material being dissolved in an alkaline medium and extruded as thin jets into an acid salt bath in which they coagulate to fibres. After the removal of the coagulation liquid, these fibres then are mixed with dyes, flavours and fillers to obtain a meat substitute suitable for human consumption.

According to another method which is described in U.S. Pat. Nos. 2,830,902 and 2,879,163, a suspension of a protein-rich raw material in water is coagulated under the influence of heat to a protein gel which is shaped into fibres by extrusion with a macaroni press.

Yet another method, described in U.S. Pat. No. 3,142,571, relates to the extrusion with expansion of protein doughs to foamy products with parallel foam lamellae providing these products with the masticability resembling that of meat.

Finally protein-rich suspensions can be coagulated to fibrous chips under the influence of heat according to U.S. Pat. No. 3,047,395.

As a raw material for producing protein fibres or other meat-substitute products with a fibre structure a flour such as defatted soybean flour or defatted ground nut flour is used. Although such raw materials are cheap, several serious disadvantages are involved in their use when making meat substitutes, such as a. the high content of non-protein components, due to which a preliminary purification should precede the processing to edible protein fibres,
b. the strong beany flavour which is difficult to mask,
c. the presence of a component causing inconvenient flatulence when digested in the intestinal tract,
d. the brittleness of the protein fibres when stored for a long time,
e. the poor keeping quality of the protein-rich solutions to be coagulated when using a wet-spinning technique which is caused by a strongly decreasing viscosity of the pronounced alkaline protein solutions in the course of time; and
f. the acid flavour of the freshly spun protein fibres which is difficult to eliminate when using a wet-spinning technique.

According to the invention, edible protein fibres are based on casein which contains at least 0.04 gram mole of ions of alkaline earth metals, at least 0.005 gram mole of ions of alkali metals and/or ammonium and at least 0.012 gram mole of ions of polybasic acids, per 100 g of casein.

It has been found that such fibres lack the above-mentioned drawbacks and moreover are heat-resistant and remain resilient also when stored for a long time, so that these fibres can be processed to a meat substitute with a tenderness and masticability clearly resembling those of meat. Furthermore the fibres according to the invention, after drying to a moisture content of about 5 percent, can be excellently rehydrated within a few minutes by immersing them or the meat substitute comprising these fibres into hot water.

Preferably, the content of ions of alkaline earth metals, ions of alkali metals and/or ammonium and anions of polybasic acids is 0.04–0.20; 0.005–0.080 and 0.012–0.060 gram moles respectively, per 100 grams of casein. As an alkaline earth metal, alkali metal and anion of polybasic acids, calcium, sodium and/or potassium and phosphoric acid, respectively, are very suitable.

The edible protein fibres according to the invention can be made by processing a caseinate complex, whether complete or not, to fibres. If the caseinate complex is not complete, the fibres are contacted with ions of alkali metals, ammonium ions, ions of alkaline earth metals and/or anions of polybasic acids in order to convert all the casein in the caseinate complex, and the fibres are then stabilized with salts the anions of which have not been used in the previous treatment.

Preferably, the caseinate complex is prepared by mixing acid casein, water, ions of alkali metals and/or ammonium ions, ions of alkaline earth metals and/or anions on polybasic acids until the acid casein has been converted completely or partially to the caseinate complex.

The preparation of edible protein fibres from acid casein by preparing an aqueous solution thereof in sodium hydroxide to obtain a colloidal sodium caseinate solution of constant viscosity and coagulating this solution in acid salt baths is already known from U.S. Pat. No. 2,682,466. The fibres thus obtained, however, have an acid taste which is hard to remove and they are not stable during thermal treatments, such as boiling, sterilising or baking and have a strong tendency to deliquesce or to fuse.

It is preferred to prepare the caseinate complex used according to the invention by mixing the acid casein with water and 0.04–0.30 gram mole of ions of alkaline earth metals, such as calcium or magnesium, 0.005–0.10 gram mole of ions of alkali metals and/or ammonium ions, such as potassium or sodium, and 0.012–0.080 gram mole of anions polybasic acids, such as a carbonate, citrate or phosphate, per 100 grams of protein. Particularly favorable concentrations are 0.04–0.20, 0.010–0.080 and 0.012–0.060 gram mole respectively, per 100 grams of protein.

It is particularly advantageous to use calcium as the alkaline earth metal cation, potassium and/or sodium as the alkali metal cation and phosphate as the anion of polybasic acid. Treatment with these ions produces caseinate complex fibres with the most favorable strength and resiliency which, after processing to a meat-substitute, give the masticability best resembling that of meat.

There is no preference as to the order in which the various groups of ions are added to the mixture of acid casein and water. Added in any order, the admixture always leads to a caseinate complex with substantially the same properties favorable for the fibre formation. There is no pronounced preference either as to certain relative weight ratios of the various groups of ions in the complex or the magnitude of the entire number of ions and the amount of acid casein used.

It is preferred that the acid casein used in the preparation of the caseinate complex be freed, as well as possible, of anions which are not used for the preparation of this complex. This applies particularly to anions which may have remained after the precipitation of acid casein from skimmed milk, such as acetate, chloride, lactate and sulfate ions. In concentrations of more than 0.5 percent in respect of the protein such anions may prevent the formation of a homogeneous caseinate complex that is free of curdling.

The caseinate complex obtained is water-miscible in all ratios to form a homogeneous gel or a homogeneous colloidal solution. This means that the freshly prepared fibres are not stable and, during treatments, such as rinsing in distilled water or heating, have the tendency to dissolve or to melt. However, this tendency is effectively suppressed by stabilizing the fibres with salts the anions of which have not been used for the preparation of the caseinate complex. Due to this, the discrete small fibres formed remain separated from each other during further storage or processing to form a meat substitute. Preferably the fibres are stabilized with calcium gluconate, calcium lactate and/or sodium chloride. The concentrations in which these stabilizing salts are used suitably are between 1 and 5 percent of the weight of the fibre.

Of course, it is also possible to add the stabilizing salts to the mixture of dyes, flavours and fillers which is used for the further processing of the fibres to the substitute. However, the stabilizing salts do not form an essential constituent of the fibres because they are readily removed by rinsing with water. This is not the case, however, in respect of the cations and anions used for the preparation of the caseinate complex.

Concerning the chemical structure of the caseinate complex there does not exist a completely founded theoretical understanding, the part of the stabilizing salts being not entirely clear either. However, it has been ascertained by experiments that casein must be combined with both mono and polyvalent cations and anions of polybasic acids to make the manufacture of edible protein fibres with the indicated favourable properties possible. It is remarkable in this respect that edible protein fibres according to the invention can be made from the natural calcium caseinate phosphate complex present in milk. Therefore, it is assumed that the synthetically prepared caseinate complexes are derivatives of the natural calcium caseinate phosphate complex. This presumption is supported by the results achieved by Schipper (C. J. Schipper: Het caseinaatfosfaat-complex van melk; thesis: University of Agriculture, Wageningen 1961) from which it appears that synthetically prepared caseinate complexes with about the same composition as those according to the invention are comparable in many properties with the natural calcium caseinate phosphate complex of milk.

The caseinate complex can be formed to fibres in any known way, preferably, however, this is effected according to a wet-spinning method.

According to a preferred embodiment of the invention a. a viscous solution of the caseinate complex with a dry content of 5-20 percent is prepared, b. this solution having a temperature between 10° and 40°C is extruded through a spinneret into a solution of 2-10 percent of calcium lactate and 15-25 percent of sodium chloride in water of a temperature of 40°-90°C and c. the obtained fibre is washed with a 1-5 percent solution of the salts used sub(b). In (b) a spinneret with 100-1000 round holes, each with a diameter of 100-300 microns can be used with spinnerets are used in the rayon yarn industry. The correct dry content and the temperature of the caseinate complex solution depend on the selected composition of the caseinate complex and the viscosity of the solution required for spinning which preferably is between 100 and 1,000 poises. The weight ratio between the amounts of calcium and sodium salts in the coagulation bath may vary but is suitably between 1.0 : 1.5 and 1: 10. The total concentration of salts in the coagulation is preferably between 17 and 35 percent for good coagulation.

Finally, the washed fibres can be freed of adherent moisture by centrifuging or pressing between a set of rollers, whereupon they are ready for further processing to a meat substitute.

In the following examples all percentages are by weight.

EXAMPLE I a. Preparation of the caseinate complex 300 mls of milk are centrifuged for about 1/2 hour in an ultracentrifuge with an acceleration of 60,000 g, by which natural calcium caseinate phosphate complex is separated from the skimmed milk as a transparent gel. This complex is freed of undesired milk serum components by dissolving it a few times in a 20-fold excess of demineralized water and ultracentrifuging again. Yield 35 grams. Additonal batches of milk are treated in this manner to obtain a sufficient amount of natural calcium caseinate phosphate complex.

1,000 grams of the caseinate complex gel are dissolved in 1,000 mls of demineralized water of 40°C and the pH of this solution is adjusted at 8.0 by the addition of calcium hydroxide. This solution has a protein content of 14 percent and contains per 100 grams of protein (N × 6.37);

0.104 gramatoms of Ca
0.007 gramatoms of Mg
0.022 gramatoms of K + Na
0.036 grammolecules of inorganic ortho-phosphate
0.002 grammolecules of citrate b. Manufacture of fibres of the caseinate complex solution The caseinate complex solution is extruded by means of a pump through a spinneret at a speed of 20 meters/minute, the spinneret having 1,000 round holes of 0.1 mm cross section. The caseinate complex solution issues from the spinneret into a coagulation liquid bath containing a solution of 3 percent calcium lactate and 15 percent sodium chloride in demineralized water having a temperature of 75°C. White fibres are formed which can be readily transferred to a rinsing bath.

c. Purification and stabilization of the caseinate complex fibres

The freshly made caseinate complex fibres are guided through a rinsing bath having a temperature of about 40°C which contains a solution of 0.5 percent of calcium lactate and 2.5 percent of sodium chloride in demineralized water. The time of residence of the fibres in the bath is approximately 3 minutes. By means of this bath the salt content of the fibres is considerably reduced.

The bundle of fibres is discharged from the rinsing bath and freed from adhering moisture by means of rollers. The fibres thus obtained only contain about 3 percent salt of the rinsing bath.

Apart from an agreeable light salt flavour, the fibres do not have any taste. The protein content of the fibres amounts to 31 percent.

d. Processing of the edible protein fibres 1,000 g of the purified caseinate complex fibres pressed free of moisture are comminuted by cutting the bundle of fibres to pieces of 1–3 cm. Thereupon small lumps of the bundle of fibres are mixed with 1,000 grams of a mixture of the following composition:

| water | 65% |
| egg albumin | 12% |
| wheat gluten | 6% |
| onion powder | 6% |
| skim milk powder | 5% |
| whey powder | 2% |
| mono-sodium glutamate | 2% |
| dyestuff | 0.5% |
| concentrated beef aroma | 1.5% |

After intimate mixing of the components, the paste-like mass thus formed is shaped into a flat layer of a height of about 3 cm. This layer is cut to rectangular blocks which can be excellently cooked in water of 100°C or fried with butter. The cooked or fried lumps thus obtained not only have a meat flavour, but resemble the masticability of luncheon meat or salami-type sausage. It appears from a microscopical examination of these products that the fibre structure of the co-processed artificial protein fibres has been maintained for the greater part. The cooked lumps of meat-substitute comprise substantially no fat which is particularly favourable for patients with cardiac and vascular disorders.

The isolation of the natural calcium caseinate phosphate complex from skimmed milk by means of an ultracentrifuge is economically unattractive according to the present state of the art. However, it appears from this example that natural caseinate complex present in milk can be used for the preparation of the edible protein fibres according to the invention.

EXAMPLE II a. Preparation of the caseinate complex

A suspension is prepared of 16 kgs of acid casein of edible quality in 100 l of demineralized water. With vigorous stirring, 800 grams of calcium hydroxide are added to this in small portions in about 10 minutes. After about another 30 minutes of stirring, a solution of 720 grams of $NaH_2PO_4 \cdot H_2O$ in 7.5 litres of demineralized water is added and the stirring is continued for about another hour. Thereupon the caseinate complex solution thus obtained at a temperature of about 25° is heated to about 80°C and this solution is freed of undissolved particles by homogenization. Finally the solution of the caseinate complex having a pH of 7.0 is cooled to about 30°C.

From this solution, protein fibres are produced according to Example I, part (b). The dull-white fibres obtained can be removed from the coagulation liquid without difficulties.

These fibres are purified according to Example I, part (c). After purification, the protein content is 34 percent.

These purified protein fibres can be processed according to Example I part (d) to a meat substitute with an approximately equivalent masticability in comparison with the product of Example I.

EXAMPLE III a. Preparation of the caseinate complex

Again a suspension is prepared of 16 kg of acid casein of edible quality in 100 l of demineralized water and again 800 grams of calcium hydroxide are added to this suspension in small portions in about 10 minutes while stirring vigorously. After yet another 30 minutes of stirring, first a solution of 500 grams of $NaH_2PO_4 \cdot H_2O$ in 5 liters of demineralized water and then 1 liter of 10 percent ortho phosphoric acid in demineralized water are added. Finally stirring is continued for about another hour.

The viscous caseinate complex solution thus obtained with a temperature of about 25°C is then heated to about 80°C and this solution is freed of undissolved particles by homogenization. Finally the solution of the caseinate complex having a pH of 8.5 is cooled to about 30°C.

b. The manufacture of fibres from this solution of the caseinate complex is effected according to Example I, part (b), c. The purification and stabilization of the caseinate complex fibres are affected according to Example I, part (c).

Apart from an agreeable light taste of kitchen salt, the fibres do not have any taste. The protein content of the fibres amounts to 31 percent.

d. The processing of the edible protein fibres is effected according to Example I, part (d).

EXAMPLE IV

A solution of a caseinate complex is prepared in the manner described in Example III, part (a), with the exception that a suspension of 13 kgs of acid casein in 100 liters of demineralized water is started with. To this suspension, first 650 grams of calciumhydroxide and then 260 grams of sodium bicarbonate in 2.5 liters of water are added. After purification according to Example III part (a), the solution does not contain undissolved particles. The pH of this viscous solution of the caseinate complex is 10.0.

From this solution protein fibres are made according to Example I, part (b). The dull-white fibres obtained can be removed from the coagulation liquid without difficulty.

These small fibres are purified according to Example I part (c). After purification, the protein content is 28 percent.

These purified protein fibres can be processed according to Example I, part (d) to a meat substitute with somewhat less favourable properties in comparison with the products of Examples II and III.

EXAMPLE V a. 700 grams of calcium hydroxide b. 300 grams of $NaH_2PO_4 \cdot 1H_2O$ in 3 liters of demineralized water c. 1.6 liters of 10 percent ortho-phosphoric acid are successively added with stirring to a mixture of 10 kgs of edible acid casein and 5 liters of demineralized water.

After each addition, the components are mixed at room temperature for 30 minutes before the following component is added. Finally stirring is continued for another hour to form a homogeneous dough with a protein content of 44 percent. This dough is extruded through a die with small round holes with a diameter of 1mm. The bundle of fibres thus obtained is cut to lengths of about 1 meter.

For the stabilization, the pieces of the bundle of fibres are immersed in a bath at about 30°C, containing 1 percent of calcium lactate and 5 percent of sodium chloride in demineralized water. After 10 minutes, the pieces of the bundle of fibres are removed from the bath and these pieces are freed of adhering moisture by centrifuging. The fibres thus stabilized have a protein content of 40 percent.

Finally these fibres are processed according to Example I part (d) to a meat substitute having a masticability resembling that of meat, but inferior in this respect to the meat substitutes of Examples II and III. The cause of this is attributed to the excessively large diameter of the fibres used, which is about 1mm.

EXAMPLE VI 500 grams of calcium hydroxide, 2.0 liters of a 20 percent mono-sodium citrate solution in demineralized water, and 1.5 liters of a 20 percent citric acid solution is demineralized water are successively added with stirring and, according to Example V, to a mixture of 10 kgs of acid casein of edible casein and 5 liters of demineralized water.

According to Example V, fibres are made from the thus obtained homogeneous dough of the caseinate complex with a protein content of 44 percent. The fresh fibres are stabilized in a salt solution according to Example V and have a protein content of 42 percent after centrifuging.

According to Example I, part (d), these fibres are processed to a meat substitute having a masticability resembling that of meat, which however is inferior to that of the substitute based on the caseinate complex fibres with the preferred composition of Example III part (a), which have been made according to the preferred process of Example I (b) and (c).

EXAMPLE VII

A 17 percent sodium caseinate solution is prepared by adding to a suspension of 25 kgs of acid casein in 100 liters of demineralized water a sufficient amount of a dilute sodium hydroxide solution in water at 60°C. The sodium caseinate solution has a pH of 8.0. After cooling to 20°C, fibres are made from this solution according to Example I, part (b), a part of the sodium ions in the complex being exchanged for calcium ions. The dull-white fibres thus obtained can be transferred, without difficulty, to a subsequent bath containing an aqueous solution of 5 percent di-sodium hydrogen phosphate and 10 percent of sodium chloride. After 10 minutes, the bundle of fibres is transferred to the purification and stabilization bath of Example I part (c) and is processed in the way described there. After completion, the purified protein fibres have a protein content of 37 percent.

The fibres thus purified are processed, according to Example I part (d) to a meat substitute. This substitute has a masticability resembling that of meat, which however is inferior to that of the substitute obtained according to the preferred example III pard (d).

The process applied here for the making of caseinate complex fibres is more complicated then the preferred process of Example I part (b) and part (c) by the insertion of a separate di-sodium hydrophosphate bath and, therefore, is less attractive. However, this process elucidates the possibility of making fibres from an incomplete caseinate complex and to convert the incomplete caseinate complex present in these fibres to the complete caseinate complex by means of a suitable after-treatment. If, in the after-treatment of the freshly prepared fibres, the di-sodium hydrophosphate bath were omitted, the fibres, during the purification according to Example I part (c), would not be stable and become tacky and fuse. This would be attributable to the lack of phosphate as a polyvalent anion in the caseinate complex.

What is claimed is:

1. An edible fibrous protein product consisting essentially of casein and, per 100 grams of said casein, 0.04 to 0.30 gram mole alkaline earth metal ions, 0.005 to 0.10 gram mole of at least one member selected from the group consisting of alkali metal ions and ammonium ions, and 0.012 to 0.080 gram mole polybasic acid anions.

2. A product according to claim 1, wherein said polybasic acid is carbonic, citric, or phosphoric acid.

3. A product according to claim 1, wherein said alkaline earth metal is calcium, said at least one member is sodium ion or potassium ion, and said polybasic acid is phosphoric acid.

4. A method of producing an edible fibrous protein product which comprises:
   a. preparing an aqueous solution of a caseinate complex by dispersing in water casein and, per 100 gram of said casein, 0.04 to 0.30 gram mole alkaline earth metal ions, 0.005 to 0.10 gram mole of ions of at least one member selected from the group consisting of alkali metals and ammonium, and 0.012 to 0.080 gram mole polybasic acid anions;
   b. shaping said solution into fibers; and
   c. stabilizing said fibers by contacting the same with an aqueous solution of at least one stabilizing compound selected from the group consisting of calcium gluconate, calcium lactate, and sodium chloride until the solubility of said fibers in water is reduced.

5. A method as set forth in claim 4, wherein said polybasic acid is carbonic, citric, or phosphoric acid.

6. A method as set forth in claim 5, wherein said casein contains not more than 0.5 percent acetate, lactate, and sulfate ions.

7. A method as set forth in claim 5, wherein said fibers are contacted with said aqueous solution of said at least one stabilizing compound until they contain 1 to 5 percent of said at least one compound.

8. A method as set forth in claim 5, wherein the aqueous solution of said caseinate complex contains 5 to 20 percent solids, said fibers are formed and stabilized by extruding the solution of said caseinate complex through a spinneret at 10° to 40°C into said solution of at least one stabilizing compound, said solution of at least one stabilizing compound, said solution essentially consisting of 2 to 10 percent calcium lactate, 15 to 25 percent sodium chloride, and water and having a temperature of 40° to 90°C., and the formed and stabilized fibers are washed in an aqueous solution of 1 to 5 percent of said at least one stabilizing compound until the salt content of said fibers is reduced.

9. A method of producing an edible fibrous protein product which comprises:
 a. preparing an aqueous solution of casein in dilute sodium hydroxide solution;
 b. shaping said solution into fibers;
 c. contacting said fibers with an aqueous solution of at least one compound selected from the group consisting of calcium gluconate and calcium lactate until a portion of the sodium ions in said fibers is replaced by calcium ions; and
 d. contacting the said fibers with an aqueous solution of phosphate ions.

* * * * *